United States Patent
Nakamura

(10) Patent No.: US 9,531,898 B2
(45) Date of Patent: Dec. 27, 2016

(54) IMAGE FORMING APPARATUS

(71) Applicant: KYOCERA Document Solutions Inc., Osaka-shi, Osaka (JP)

(72) Inventor: Shigeaki Nakamura, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 15/051,577

(22) Filed: Feb. 23, 2016

(65) Prior Publication Data

US 2016/0255229 A1  Sep. 1, 2016

(30) Foreign Application Priority Data

Feb. 26, 2015 (JP) ................................. 2015-036799

(51) Int. Cl.
*H04N 1/00* (2006.01)
*G03G 15/00* (2006.01)

(52) U.S. Cl.
CPC ...... *H04N 1/00891* (2013.01); *G03G 15/5004* (2013.01); *H04N 2201/0094* (2013.01)

(58) Field of Classification Search
CPC ................. H04N 1/00891; H04N 2201/0094; G03G 15/5004
USPC ....................................... 358/1.13
See application file for complete search history.

(56) References Cited

U.S. PATENT DOCUMENTS

| 8,635,479 B2* | 1/2014 | Soga | G03G 15/5004 713/320 |
| 2011/0138215 A1* | 6/2011 | Kojima | H03K 3/011 713/500 |
| 2014/0356007 A1* | 12/2014 | Kurokawa | G03G 15/205 399/67 |
| 2014/0376941 A1* | 12/2014 | Okuzono | G03G 15/5004 399/75 |

FOREIGN PATENT DOCUMENTS

| JP | 2007114330 A | 5/2007 |
| JP | 2008170823 A | 7/2008 |
| JP | 2013130801 A | 7/2013 |
| JP | 2013182063 A | 9/2013 |

* cited by examiner

*Primary Examiner* — Allen H Nguyen
(74) *Attorney, Agent, or Firm* — Alleman Hall McCoy Russell & Tuttle LLP

(57) ABSTRACT

A control portion shifts a state of a self-apparatus to a power saving mode if a duration of an operation event wait state has reached a preset power saving shift set time. Further, the control portion temporarily changes the power saving shift set time to a longer time if an extension condition is satisfied. The extension condition includes occurrence, with a predetermined frequency, of a situation where a target parameter value satisfies a predetermined short-term return condition. The target parameter value is a duration of the power saving mode at a time of state return or a value of a parameter which changes in accordance with the duration of the power saving mode.

5 Claims, 9 Drawing Sheets

IMAGE FORMING APPARATUS

INCORPORATION BY REFERENCE

This application is based upon and claims the benefit of priority from the corresponding Japanese Patent Application No. 2015-036799 filed on Feb. 26, 2015, the entire contents of which are incorporated herein by reference.

BACKGROUND

The present disclosure relates to an image forming apparatus having a function to shift a state of the self-apparatus from a standard mode to a power saving mode.

In general, an image forming apparatus is known to perform power saving control in which a state of the self-apparatus is shifted from a standard mode to a power saving mode. In the image forming apparatus that is of an electrophotographic type, the power saving mode may be a state where power supply to a fixing heater which heats a developer image formed on a sheet-like image recording medium.

For example, the image forming apparatus is known to: count a time for which, after end of execution of a job for image formation, the image forming apparatus waits for reception of the new job for image formation; and shift the state of the self-apparatus to the power saving mode if the counted time has reached a predetermined time. Upon reception of the new job in the power saving mode, the image forming apparatus returns to the standard mode and executes the job.

SUMMARY

An image forming apparatus according to one aspect of the present disclosure includes a power saving control portion, a return control portion, and a power saving shift time extension portion. The power saving control portion is configured to shift a state of the self-apparatus to a power saving mode where power consumption is lower than in a standard mode, if a duration of an event wait state for which occurrence of an operation event is waited for has reached a preset power saving shift set time. The operation event is an event including reception of a new job regarding image formation. The return control portion is configured to shift the state of the self-apparatus to the standard mode if the operation event occurs in the power saving mode. The power saving shift time extension portion is configured to temporarily change the power saving shift set time to a longer time if a predetermined extension condition is satisfied. The extension condition is a condition including occurrence, with a predetermined frequency, of a situation where a duration of the power saving mode at a time of state return or a target parameter value satisfies a predetermined short-term return condition. The time of state return is a time when the state of the self-apparatus is shifted from the power saving mode to the standard mode by the return control portion. The target parameter value is a value of a parameter which changes in accordance with the duration of the power saving mode.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments will be described with reference to the accompanying drawings. The following embodiments are examples embodying the present disclosure and do not have nature of limiting the technical scope of the present disclosure.

First Embodiment

First, a schematic configuration of an image forming system including an image forming apparatus 10 according to a first embodiment will be described with reference to FIG. 1.

Figure 1:
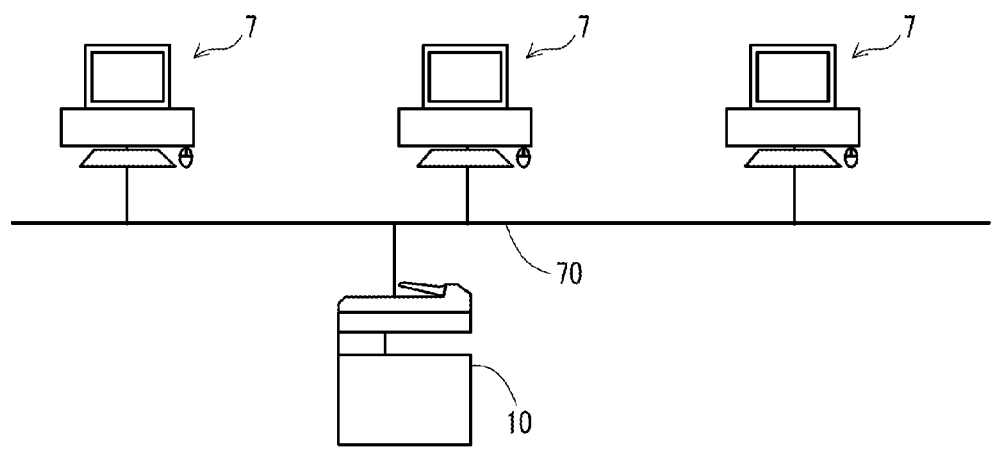
FIG. 1 is a configuration diagram of an image forming system including an image forming apparatus according to a first embodiment.

As shown in FIG. 1, the image forming system includes the image forming apparatus 10 and terminal apparatuses 7. The image forming apparatus 10 is able to communicate with the terminal apparatuses 7 via a communication line 70. The communication line 70 is, for example, a local area network (LAN). Each terminal apparatus 7 is an information processing apparatus such as a personal computer, a tablet computer, or a smartphone.

The image forming apparatus 10 has a function of a printer to receive a print job which is a job for image formation, from the terminal apparatus 7 and form an image represented by the print job, on a sheet-like image recording medium 9. The image forming apparatus 10 according to the present embodiment is a multifunction peripheral further also having a function of a copying machine and a function of a scanner. In addition, the image forming apparatus 10 may also have a facsimile communication function.

The image forming apparatus 10 that functions as the copying machine executes a copying job of reading an image of a document sheet 90 and forming the image of the document sheet 90 on an image recording medium 9. The copying job is a job received by the image forming apparatus 10 in accordance with an operation performed by a user, and is an example of a job regarding image formation.

The image forming apparatus 10 that functions as the scanner executes a document scan job of reading the image of the document sheet 90 and transmitting obtained image data of the document sheet 90 to the terminal apparatus 7. The document scan job is a job received by the image forming apparatus 10 in accordance with an operation performed by the user.

Entire Configuration of Image Forming Apparatus 10

Figure 2:
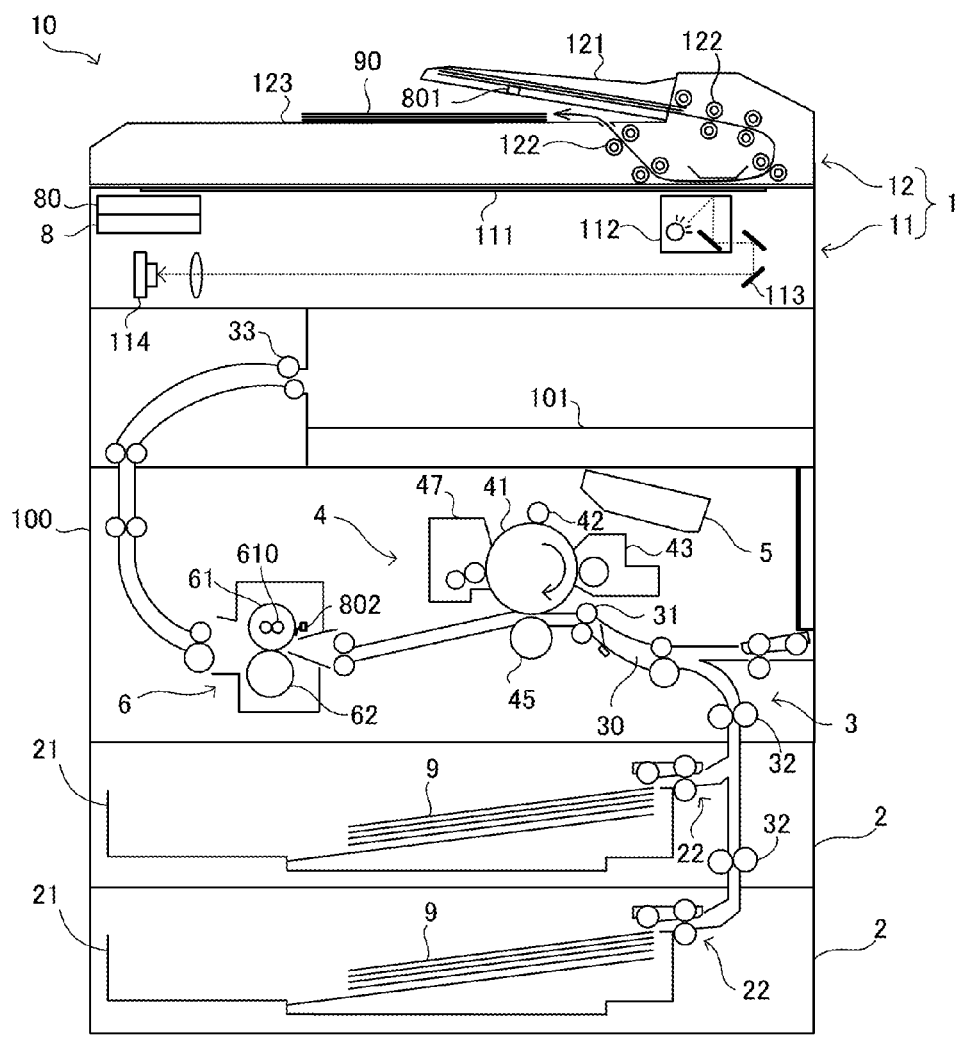
FIG. 2 is a configuration diagram of the image forming system according to the first embodiment.

Next, a schematic configuration of the entirety of the image forming apparatus 10 will be described with reference to FIG. 2. The image forming apparatus 10 includes a sheet feed portion 2, a sheet conveying portion 3, an image forming portion 4, an optical scanning portion 5, and a fixing portion 6. The image forming portion 4, the optical scanning portion 5, and the fixing portion 6 perform an electrophotographic image forming process.

The image forming apparatus 10 further includes a document conveying/reading portion 1, a control portion 8, an operation display portion 80, a document sensor 801, and a fixing temperature sensor 802, etc.

The document conveying/reading portion 1 includes an image reading portion 11 and an auto document feeder (ADF) 12. The image reading portion 11 includes a document table 111, a reading unit 112, an optical system 113 such as a mirror and a lens, and an image sensor 114, etc.

The document table 111 is a portion on which the document sheet 90 is placed, and is provided at an upper surface of the image reading portion 11. The reading unit 112 applies light to the document sheet 90 that is present at a reading position on the document table 111, and reflects reflected light of the light toward the optical system 113. The reading unit 112 is movable in a sub-scanning direction. The sub-scanning direction is the right-left direction when FIG. 2 is seen.

The optical system 113 guides the reflected light from the document sheet 90, to the image sensor 114. The image sensor 114 includes a photoelectric conversion element, etc., and outputs an electric signal corresponding to an amount of received light, as image data representing the image of the document sheet 90, to the control portion 8.

The ADF 12 includes a plurality of conveying rollers 122 which convey the document sheet 90. The ADF 12 passes the document sheet 90 set on a document placement portion 121, through the reading position on the document table 111 and conveys the document sheet 90 to a sheet discharge tray 123. The document sensor 801 is a sensor which detects whether the document sheet 90 is placed on the document placement portion 121.

The sheet feed portion 2 includes a sheet receiving portion 21 and a sheet sending-out portion 22. The sheet receiving portion 21 is configured to allow a plurality of image recording media 9 to be placed in a stacked manner thereon.

The image recording media 9 are sheet-like members such as paper, coated paper, postcards, envelopes, OHP sheets, and the like.

The sheet sending-out portion 22 sends out the image recording media 9 placed on the sheet receiving portion 21, one by one, toward a conveyance path 30 in the sheet conveying portion 3.

The sheet conveying portion 3 includes registration rollers 31, conveying rollers 32, and discharge rollers 33, etc. The registration rollers 31 and the conveying rollers 32 convey the image recording medium 9 fed from the sheet feed portion 2, along the conveyance path 30 toward the image forming portion 4. Furthermore, the discharge rollers 33 discharge the image recording medium 9 on which an image has been formed, through a discharge port of the conveyance path 30 onto a discharge tray 101.

The image forming portion 4 forms an image on a surface of the image recording medium 9 moving on the conveyance path 30. The image forming portion 4 includes a drum-shaped photosensitive member 41, a charging portion 42, a developing portion 43, a transfer portion 45, and a cleaning portion 47, etc. The photosensitive member 41 is an example of an image carrier.

The photosensitive member 41 rotates, and the charging portion 42 uniformly charges the surface of the photosensitive member 41. Furthermore, the optical scanning portion 5 performs scanning with laser light thereby to write an electrostatic latent image onto the surface of the photosensitive member 41, and the developing portion 43 supplies toner to the photosensitive member 41 thereby to develop the electrostatic latent image into a toner image.

Furthermore, the transfer portion 45 transfers the toner image on the photosensitive member 41, onto the image recording medium 9 moving on the conveyance path 30. Finally, the cleaning portion 47 removes the toner remaining on the surface of the photosensitive member 41.

The fixing portion 6 nips the image recording medium 9 on which the toner image has been formed, between a fixing roller 61 housing a heater 610 and a pressure roller 62, and sends out the image recording medium 9 to the following process step. At this time, the heater 610 heats the toner image formed on the sheet-like image recording medium 9, via the fixing roller 61. By so doing, the fixing portion 6 fixes, onto the image recording medium 9, the toner image (image) on the image recording medium 9. The toner is an example of a developer.

The fixing temperature sensor 802 is a sensor which detects the temperature of the fixing roller 61, and is, for example, a thermistor or the like. In the following description, the detected temperature of the fixing temperature sensor 802 is referred to as fixation detection temperature Th. The fixing temperature sensor 802 is an example of a temperature sensor which detects the temperature of a portion heated by the heater 610.

The heater 610 is an electric heat source such as a halogen heater. An energization state of the heater 610 is controlled by the control portion 8 which performs feedback control of the fixation detection temperature Th.

The operation display portion 80 includes: an information inputting operation portion including, for example, a touch panel and an operation button, etc.; and a display portion including a liquid crystal display panel and a notification lamp, etc. For example, the operation portion includes a start button through which start events for various processes such as a process (scan process) of reading the image of the document sheet 90 are caused to occur.

The control portion 8 displays an operation menu and the like on the operation display portion 80. Furthermore, the control portion 8 controls electric devices such as a peripheral device and a motor on the basis of input information inputted through an operation of the operation display portion 80 and detection results of various sensors.

Control Portion 8

Figure 3:
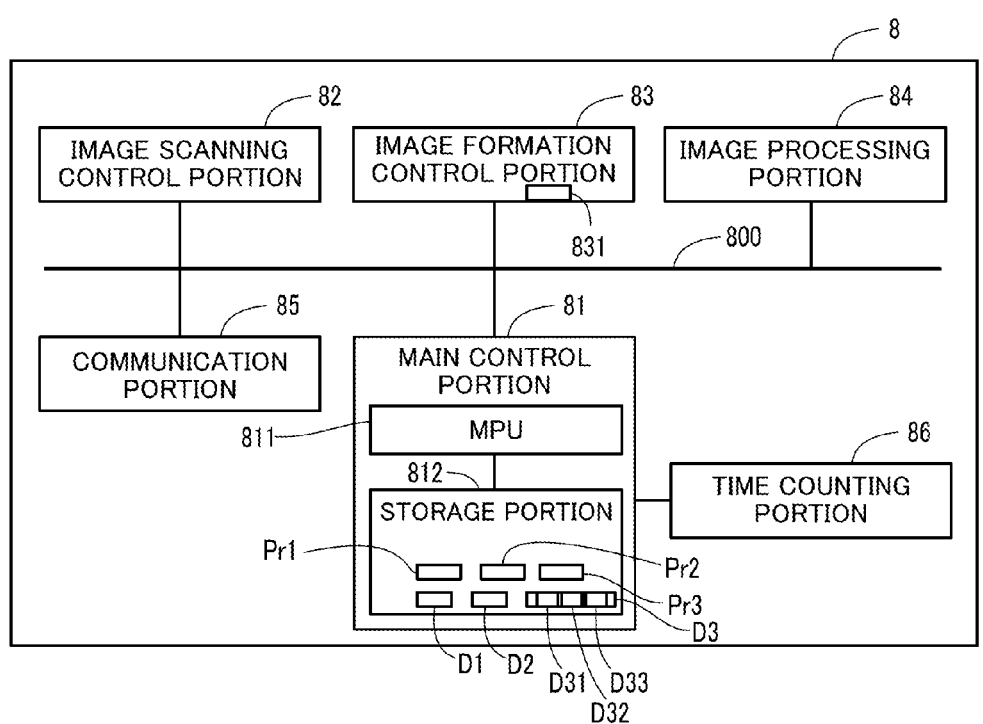
FIG. 3 is a block diagram of a control portion of the image forming apparatus according to the first embodiment.

Next, the configuration of the control portion 8 will be described with reference to FIG. 3. The control portion 8 includes a main control portion 81, an image scanning control portion 82, an image formation control portion 83, an image processing portion 84, a communication portion 85, and a time counting portion 86, etc. The main control portion 81 includes a microprocessor unit (MPU) 811 and a storage portion 812, etc.

The main control portion 81, the image scanning control portion 82, the image formation control portion 83, the image processing portion 84, and the communication portion 85 are connected to a bus 800 and are able to exchange data with one another via the bus 800.

The MPU 811 is a processor which performs various types of calculation and data processing. The storage portion 812 is a non-transitory computer-readable non-volatile memory which stores various types of information to which the MPU 811 refers. In addition, the storage portion 812 is also a memory on which reading and writing of various types of information by the MPU 811 are enabled.

For example, the storage portion 812 stores programs for causing the MPU 811 to perform various types of processing, and information to which the MPU 811 executing these programs refers, etc.

The main control portion 81 centrally controls the image forming apparatus 10 by the MPU 811 executing various programs stored previously in the storage portion 812. The main control portion 81 also includes a volatile storage portion, such as a RAM, which temporarily stores a program for causing the MPU 811 to perform each step described later and is not shown.

The image scanning control portion 82 controls the document conveying/reading portion 1 to acquire image data of the document sheet 90 from the image reading portion 11. Furthermore, the image scanning control portion 82 transfers the document image data via the bus 800 to another device such as the image processing portion 84 and the like.

The image formation control portion 83 acquires recording image data from the image processing portion 84 and causes the image forming portion 4 and the optical scanning portion 5 to perform a process of forming, on the image recording medium 9, an image based on the recording image data.

In addition, the image formation control portion 83 includes a fixation control portion 831. The fixation control portion 831 controls the energization state of the heater 610 of the fixing portion 6 through feedback control of the fixation detection temperature Th. For example, the fixation control portion 831 adjusts an amount of power to be supplied to the heater 610, through PWM control in accordance with a deviation between a preset target fixing temperature and the fixation detection temperature Th.

The image processing portion 84 performs various types of data processing on image data and the like acquired from another device via the bus 800. A target for the data processing by the image processing portion 84 is, for example, the document image data acquired from the image reading portion 11 via the image scanning control portion 82, or the print job acquired from the terminal apparatus 7 via the communication portion 85.

For example, the image processing portion 84 performs a process of converting the document image data acquired from the image scanning control portion 82 and the print job acquired from the communication portion 85, into the recording image data, and transferring the recording image data to the image formation control portion 83. Furthermore, the image processing portion 84 also has a function to perform image processing, such as image rotation processing, halftone processing, or size cut processing, on the document image data acquired from the image scanning control portion 82.

The communication portion 85 is a communication interface which performs transmission and reception of data to and from an external apparatus such as the terminal apparatuses 7 via the communication line 70. Furthermore, the communication portion 85 exchanges data with another device of the image forming apparatus 10 via the bus 800.

The time counting portion 86 is a clock circuit which counts time. Count information of the time counting portion 86 is transmitted to the main control portion 81.

The main control portion 81 performs power saving control and return control in each of which a state of power supply to the internal devices of the image forming apparatus 10 is switched. The power saving control is control of shifting the state of power supply to the internal devices of the image forming apparatus 10 from a standard mode to a power saving mode. The return control is control of shifting the state of power supply to the internal devices of the image forming apparatus 10 from the power saving mode to the standard mode.

The standard mode is a state where the above-described job regarding image formation is promptly executable. The power saving mode is a state where power consumption is lower than in the standard mode.

In the electrophotographic type image forming apparatus 10, a relatively long time is taken to increase the temperature of the fixing roller 61 by the heater 610 from ordinary temperature to a set temperature required to fix the toner image. Thus, the standard mode is a state where the target fixing temperature is set at a temperature required to fix the toner image or a temperature close to the required temperature, and an amount of power to be supplied to the heater 610 is controlled through feedback control of the fixation detection temperature Th.

The standard mode in the present embodiment is divided into two stages, a first standard mode and a second standard mode. The first standard mode is a state from occurrence of the print job or the copying job to end of execution of the print job or the copying job. The second standard mode is a state from the end of the print job or the copying job to reception of the new job or shift to the power saving mode.

The target fixing temperature in the second standard mode is set so as to be slightly lower than the target fixing temperature in the first standard mode. For example, a temperature lower than a first target fixing temperature Ts1 in the first standard mode by about 10° C. to 20° C. is set as a second target fixing temperature Ts2 in the second standard mode.

In the image forming apparatus 10, the power consumption of the heater 610 is higher than that of any other internal device. Thus, the power saving mode is a state where power supply to the heater 610 is stopped.

In the power saving mode, a state of power supply to the devices other than the heater 610 may be switched to a state where power consumption is lower than in the standard mode. For example, in the power saving mode, the MPU 811 of the main control portion 81 may shift to a state where the MPU 811 operates with an operation clock of a lower frequency than the operation clock of a standard frequency in the standard mode.

The main control portion 81 performing the power saving control shifts a state of the self-apparatus to the power saving mode if at least a time for which reception of the new job regarding image formation is waited for has reached a preset set waiting time tks. In the present embodiment, the set waiting time tks is an example of a power saving shift set time.

Furthermore, upon reception of the new job in the power saving mode, the main control portion 81 performing the return control returns the state of the self-apparatus from the power saving mode to the standard mode and causes the other control portions 82 and 83 corresponding to the received job to execute the job.

Meanwhile, in a conventional image forming apparatus, a use status where reception of the new job occurs frequently in a relatively short time from shift to the power saving mode is conceivable. In such a use status, a situation where a delay time from reception of the job to execution of the job becomes long occurs frequently. Thus, the efficiency of processing of the job greatly decreases, but the power saving effect is low.

For example, in the use status, a situation where stop and start of power supply to the fixing heater 610 are performed at a relatively short time interval can occur due to control of shift to the power saving mode. In this case, as compared to the case where feedback control of the temperature of the heater 610 is continued, the delay time is long, and the power saving effect on the heater 610 is low, or the power consumption of the heater 610 can rather increase.

Figure 7A:
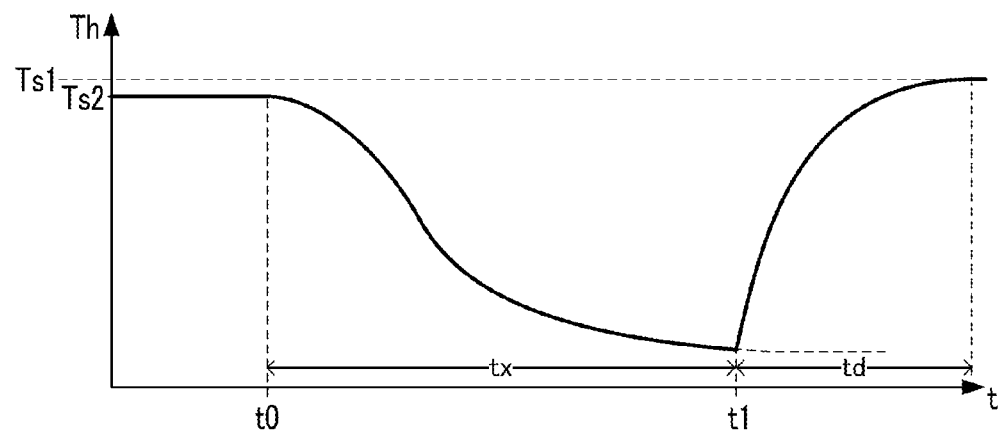
FIGS. 7A and 7B are trend graphs of a fixation detection temperature and heater power when a print job is executed after a relatively long time from shift to a power saving mode in the image forming apparatus.
Figure 7B:
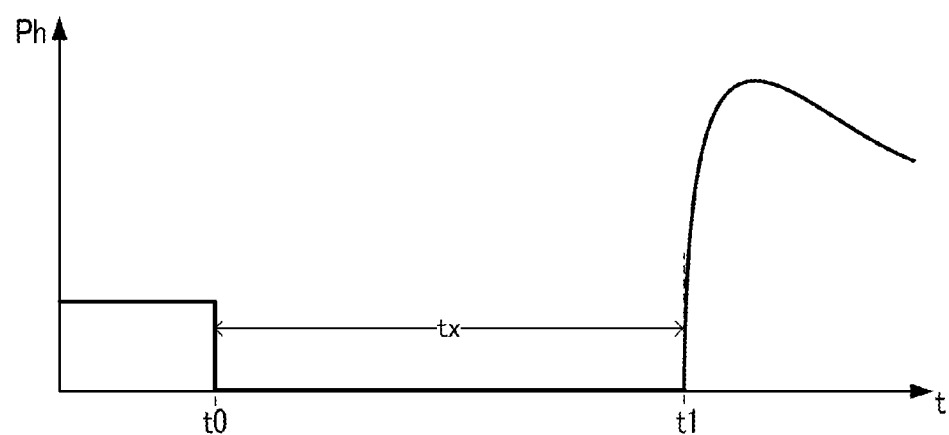
Figure 8A:
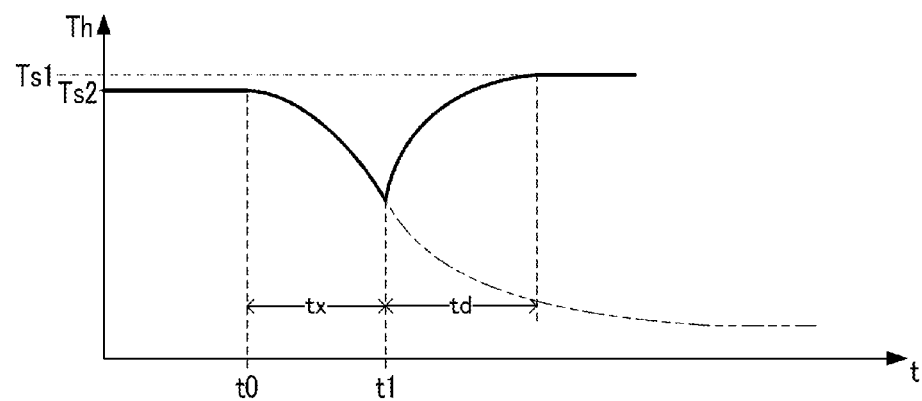
FIGS. 8A and 8B are trend graphs of a fixation detection temperature and heater power when a print job is executed after a relatively short time from shift to the power saving mode in the image forming apparatus.
Figure 8B:
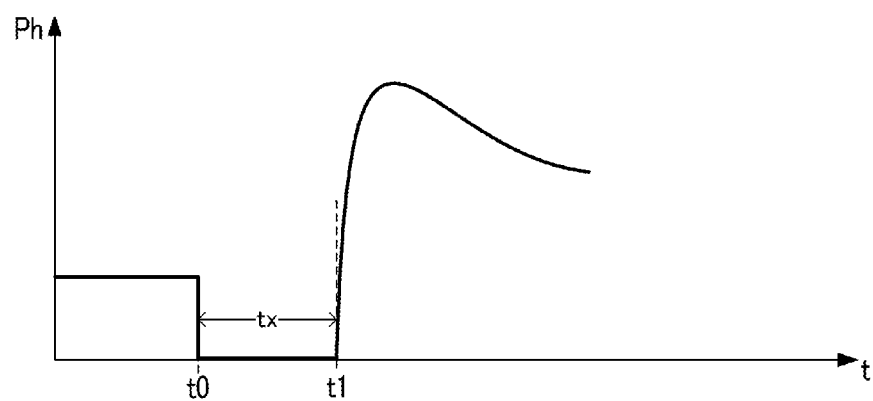

FIGS. 7A, 7B, 8A, and 8B are trend graphs of the fixation detection temperature Th and heater power Ph. FIGS. 7A and 8A are trend graphs of the fixation detection temperature Th, and FIGS. 7B and 8B are trend graphs of the heater power Ph.

In each graph, t0 is a time point when a time for which reception of the new job regarding image formation is waited for reaches the preset set waiting time tks. In the following description, this time point is referred to as starting point. In addition, t1 is a job reception time point when the print job is received, and tx is a heater stop period. From the time point when the fixation detection temperature Th increases to the first target fixing temperature Ts1, the print job is executable.

FIGS. 7A and 7B show the case where the state of the apparatus shifts from the second standard mode to the power saving mode at the starting point t0 and the time from the starting point t0 to the job reception time point t1 is relatively long. In this case, although a delay time td from the job reception time point t1 to the time of start of execution of the print job is long, since the heater stop period tx is long, the power saving effect is high.

In addition, FIGS. 8A and 8B show the case where the state of the apparatus shifts from the second standard mode to the power saving mode at the starting point t0 and the time from the starting point t0 to the job reception time point t1 is relatively short. In this case, since the delay time td from the job reception time point t1 to the time of start of execution of the print job is long, and the heater stop period tx is short, the power saving effect is low.

In the use status as shown in FIGS. 8A and 8B, a situation where the delay time td becomes long occurs frequently. Thus, the efficiency of processing of the job greatly decreases, but the power saving effect is low.

On the other hand, if the image forming apparatus 10 is adopted, by the main control portion 81 performing energization control described later, it is made possible to prevent control of shift to the power saving mode from causing deterioration of the efficiency of processing of the job and of the power saving effect.

Energization Control

Next, an example of a procedure of the energization control performed by the main control portion 81 will be described with reference to a flowchart shown in FIG. 4. In the following description, S101, S102, . . . represent identification characters for respective steps executed by the main control portion 81.

Figure 4:
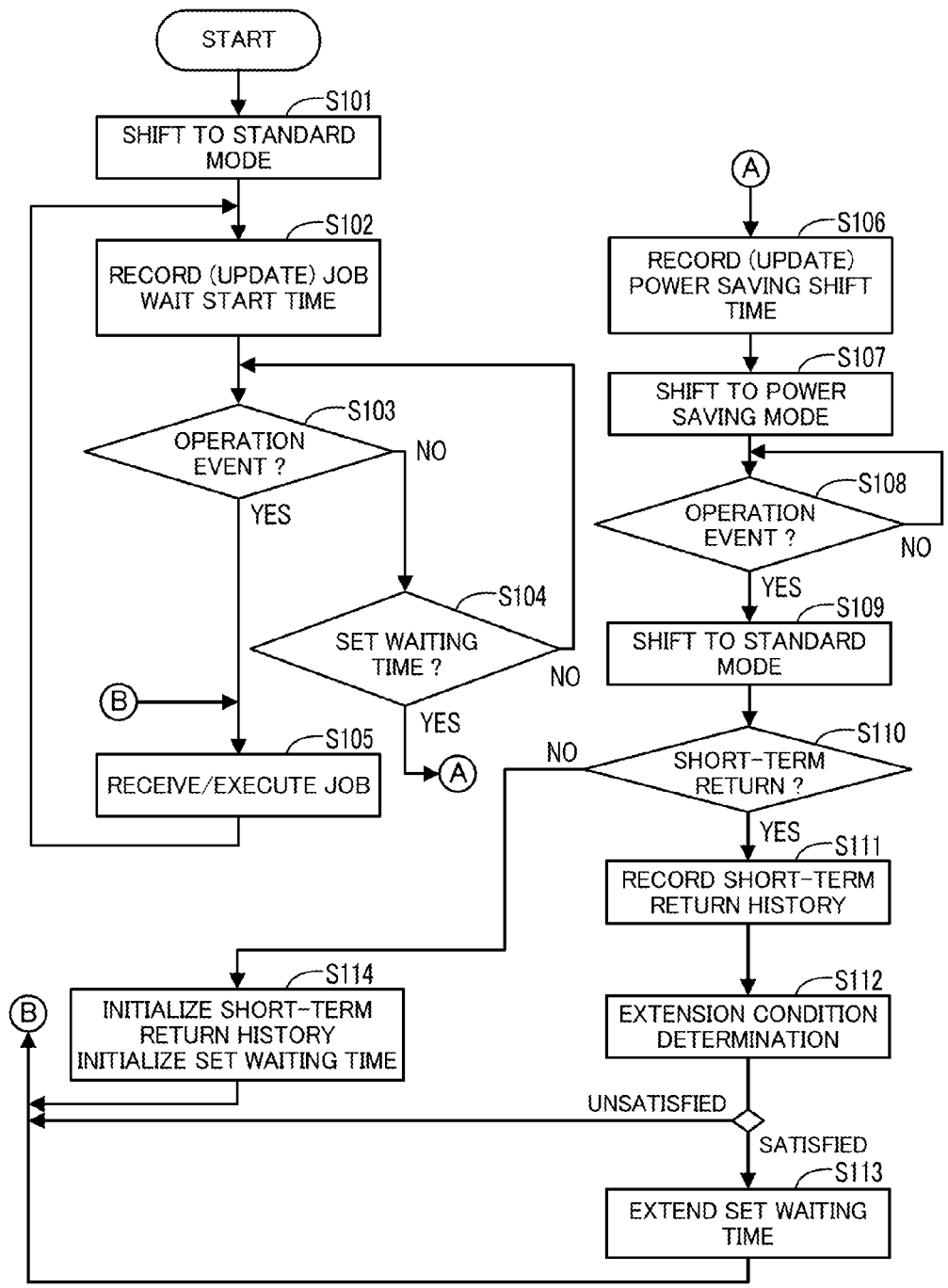
FIG. 4 is a flowchart showing an example of a procedure of energization control performed by the image forming apparatus according to the first embodiment.

When, for example, the main control portion 81 activates due to start of energization or a predetermined start operation is performed on the operation display portion 80 after the start of energization, the main control portion 81 starts the energization control shown in FIG. 4.

The energization control by the main control portion 81 is performed by the MPU 811 executing a power saving control program Pr1, a return control program Pr2, and a power saving shift time extension program Pr3.

<Step S101>
First, the main control portion 81 shifts the state of the self-apparatus to the standard mode. At this time, the fixation control portion 831 sets the target fixing temperature at the second target fixing temperature Ts2. Accordingly, the state of the self-apparatus shifts to the second standard mode.

<Step S102>
Furthermore, the main control portion 81 records the time at this time point as a job wait start time D1 in the storage portion 812. If the job wait start time D1 has been already recorded, the job wait start time D1 is updated. The time is counted by the time counting portion 86.

<Step S103>
Next, the main control portion 81 monitors occurrence of a predetermined operation event including reception of the new print job. Examples of the operation event include, in addition to reception of the print job, detection of a predetermined operation on the operation display portion 80. The predetermined operation is, for example, an activation operation or a job selection operation.

In the present embodiment, a state from step S103 to occurrence of the operation event is an event wait state.

<Step S104>
If occurrence of the operation event is not detected in step S103, the main control portion 81 determines whether an elapsed time from the job wait start time D1 has reached the preset set waiting time tks.

If the elapsed time from the job wait start time D1 has not reached the set waiting time tks, the main control portion 81 repeats the process from step S103. On the other hand, if the elapsed time from the job wait start time D1 has reached the set waiting time tks, the main control portion 81 shifts the process to step S106 described later.

<Step S105>
If the operation event occurs before the elapsed time from the job wait start time D1 reaches the set waiting time tks, the main control portion 81 performs a process corresponding to the operation event that has occurred.

That is, if the operation event is reception of the print job, the main control portion 81 causes the image formation control portion 83 to execute the print job. In addition, if the operation event is an operation on the operation display portion 80, the main control portion 81 performs a process of receiving the above-described copying job or the above-described scan job via the operation display portion 80, and then causes the other control portions 82 and 83 corresponding to the received job to execute the job.

For example, if the received job is the copying job, the main control portion 81 causes the image scanning control portion 82 and the image formation control portion 83 to execute the copying job.

If the job received by the main control portion 81 is the print job or the copying job, the fixation control portion 831 changes the target fixing temperature from the second target fixing temperature Ts2 to the first target fixing temperature Ts1. Accordingly, the state of the self-apparatus shifts from the second standard mode to the first standard mode to obtain a state where a process of fixing the toner image is enabled.

When the execution of the job ends, the fixation control portion 831 changes the target fixing temperature from the first target fixing temperature Ts1 to the second target fixing temperature Ts2 which is slightly lower than the first target fixing temperature Ts1. Accordingly, the state of the self-apparatus shifts to the second standard mode. When the execution of the job ends, the main control portion 81 repeats the process from step S102.

<Step S106>

On the other hand, if the operation event has not occurred and the elapsed time from the job wait start time D1 reaches the set waiting time tks, the main control portion 81 records the time at this time point as a power saving shift time D2 in the storage portion 812. If the power saving shift time D2 has been already recorded, the power saving shift time D2 is updated. The time is counted by the time counting portion 86.

<Step S107>

Furthermore, the main control portion 81 shifts the state of the self-apparatus from the standard mode to the power saving mode. Accordingly, power supply to the heater 610 stops.

The processes in steps S101 to S107 are performed by the MPU 811 executing the power saving control program Pr1. When the MPU 811 executes the power saving control program Pr1, if the duration of the event wait state where occurrence of the operation event is waited for has reached a preset power saving shift set time, the main control portion 81 shifts the state of the self-apparatus to the power saving mode. When the MPU 811 executes the power saving control program Pr1, the main control portion 81 is an example of a power saving control portion.

<Step S108>

In the power saving mode, the main control portion 81 monitors occurrence of a predetermined operation event including reception of the new print job. Examples of the operation event include, in addition to reception of the print job, detection of a predetermined activation operation on the operation display portion 80.

<Step S109>

If the operation event occurs in the power saving mode, the main control portion 81 shifts the state of the self-apparatus from the power saving mode to the standard mode. For example, if the operation event that has occurred is reception of the print job, the fixation control portion 831 sets the target fixing temperature at the first target fixing temperature Ts1 in accordance with control of shift to the standard mode by the main control portion 81. Accordingly, the state of the self-apparatus shifts to the first standard mode.

If the operation event that has occurred is the activation operation on the operation display portion 80, the fixation control portion 831 sets the target fixing temperature at the second target fixing temperature Ts2 in accordance with the control of shift to the standard mode by the main control portion 81. Accordingly, the state of the self-apparatus shifts to the second standard mode.

In the following description, a situation where the state of the image forming apparatus 10 shifts from the power saving mode to the standard mode by the process in step S109 is referred to as a time of state return. The time of state return means a period from the time point when the operation event occurs in the power saving mode to the time when a slight time elapses from completion of shift to the standard mode.

The processes in steps S108 and S109 are performed by the MPU 811 executing the return control program Pr2. When the MPU 811 executes the return control program Pr2, if the operation event occurs in the power saving mode, the main control portion 81 shifts the state of the self-apparatus to the standard mode. When the MPU 811 executes the return control program Pr2, the main control portion 81 is an example of a return control portion.

<Step S110>

Furthermore, the main control portion 81 determines whether the duration of the power saving mode at the time of state return satisfies a predetermined short-term return condition. The duration of the power saving mode is the time from the job wait start time D1 recorded in the storage portion 812 to the time at the time of state return.

The short-term return condition is, as a necessary condition, that at least the duration of the power saving mode at the time of state return does not exceed a preset upper limit time. For example, a condition that the duration of the power saving mode is less than the upper limit time may be adopted as the short-term return condition. In addition, a condition that the duration of the power saving mode is within the range from a preset lower limit time to the upper limit time may be adopted as the short-term return condition.

A situation where the short-term return condition is satisfied is, for example, the situation as shown by the graphs in FIGS. 8A and 8B. If a use status of the image forming apparatus 10 where the short-term return condition is satisfied occurs frequently, a situation where the delay time td from reception of the job to execution of the job becomes long occurs frequently. Thus, the efficiency of processing of the job greatly decreases, but the power saving effect is low.

<Step S111>

If the duration of the power saving mode at the time of state return satisfies the short-term return condition, the main control portion 81 records, in the storage portion 812, at least short-term return history information D3 representing frequency with which the short-term return condition becomes satisfied.

In the present embodiment, the short-term return history information D3 includes information of a number of times of condition satisfaction D31 representing the number of times the short-term return condition becomes satisfied. The short-term return history information D3 further includes information of a number of users D32 and user identification information D33. The number of users D32 is the number of users corresponding to the print jobs and the copying jobs received while the number of times of condition satisfaction D31 is counted up.

The user corresponding to the print job is identified by user account information included in the print job. In addition, the user corresponding to the copying job is identified by the user account information inputted through the operation display portion 80 before reception of the copying job.

The main control portion 81 records the user account information corresponding to the job as the user identification information D33 together with the number of users D32 in the storage portion 812. Then, if the user account information corresponding to the job is new information that is not included in the recorded user identification information D33, the main control portion 81 counts up the number of users D32.

<Step S112>

After recording the short-term return history information D3, the main control portion 81 determines whether a predetermined extension condition is satisfied. The extension condition is a condition including occurrence, with a predetermined frequency, of a situation where the duration of the power saving mode at the time of state return satisfies the short-term return condition.

The extension condition in the present embodiment is that a situation where the short-term return condition is satisfied occurs with the predetermined frequency and the jobs corresponding to users the number of which is equal to or greater than a predetermined number are received during the situation.

More specifically, the extension condition in the present embodiment is a condition that the number of times of condition satisfaction D31 of the short-term return history information D3 exceeds a preset allowable number of times and the number of users D32 of the short-term return history information D3 exceeds a preset allowable number of persons. The allowable number of times for the number of times of condition satisfaction D31 is an example of the above-described frequency.

In a situation where a situation where the job is received at timing when the short-term return condition is satisfied occurs consecutively, it is considered that there is a high possibility that if the number of users D32 is large, reception of the job occurs later at the similar timing more frequently than in the case where the number of users D32 is small. Therefore, since the extension condition includes the condition for the number of users D32, a situation where reception of the job occurs frequently at timing when the short-term return condition is satisfied can be predicted early.

The extension condition may be only that the number of times of condition satisfaction D31 exceeds the allowable number of times. In addition, the extension condition may be a logical OR condition of a plurality of conditions different from each other in the allowable number of times for the number of times of condition satisfaction D31 or the allowable number of persons for the number of users D32.

If the extension condition is not satisfied, the main control portion 81 repeats the process from step S105.

<Step S113>

If the extension condition is satisfied, the main control portion 81 changes the set waiting time tks from an initial value to a predetermined value greater than the initial value. That is, the main control portion 81 extends the set waiting time tks. Thereafter, the main control portion 81 repeats the process from step S105.

The number of times the set waiting time tks is extended is limited to a predetermined number of times. The limited number of times of extension of the set waiting time tks may be one or may be a plural number.

<Step S114>

If the short-term return condition is not satisfied in the determination in step S110, the main control portion 81 initializes the short-term return history information D3 and the set waiting time tks. Accordingly, if the set waiting time tks has been extended in step S113 in the past, the set waiting time tks is returned to the initial value. In addition, if the set waiting time tks has remained as the initial value, the set waiting time tks is maintained. Thereafter, the main control portion 81 repeats the process from step S105.

The processes in steps S110 to S114 are performed by the MPU 811 executing the power saving shift time extension program Pr3. When the MPU 811 executes the power saving shift time extension program Pr3, if the extension condition is satisfied, the main control portion 81 temporarily changes the set waiting time tks corresponding to the power saving shift set time, to a longer time. When the MPU 811 executes the power saving shift time extension program Pr3, the main control portion 81 is an example of a power saving shift time extension portion.

In the image forming apparatus 10, the main control portion 81 predicts whether a use status where reception of the new job occurs frequently in a relatively short time from the time of shift to the power saving mode, that is, a use status where the efficiency of processing of the job deteriorates and the power saving effect cannot be expected, will occur (S110 to S112).

If the main control portion 81 predicts that the use status will occur, the main control portion 81 temporarily changes the set waiting time tks to a time longer than the initial value (S113). The set waiting time tks in the present embodiment corresponds to the power saving shift set time by which timing of shifting to the power saving mode in accordance with the duration of the event wait state is determined. Accordingly, even in the above-described use status, a possibility that the job can be received before the state of the apparatus shifts to the power saving mode is increased. As a result, the efficiency of processing of the job is prevented from greatly deteriorating.

Figure 9A:
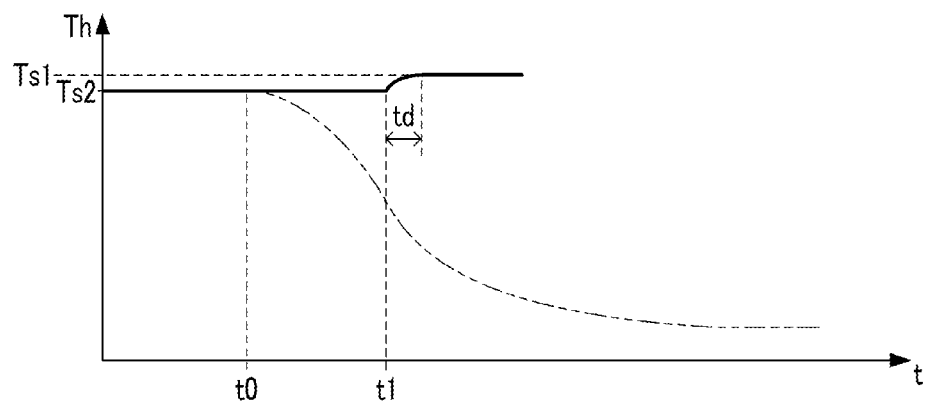
FIGS. 9A and 9B are trend graphs of a fixation detection temperature and heater power when a print job is executed while a standard mode continues in the image forming apparatus.
Figure 9B:
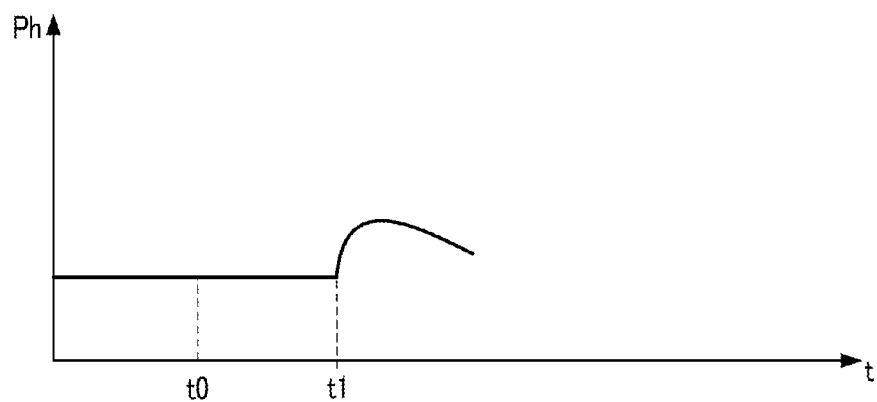

FIGS. 8A and 8B and FIGS. 9A, and 9B show statuses of control of an energization state before and after the set waiting time tks is extended in the same situation of occurrence of the job. FIGS. 8A and 9A are trend graphs of the fixation detection temperature Th, and FIGS. 8B and 9B are trend graphs of the heater power Ph.

FIGS. 9A, and 9B are trend graphs of the fixation detection temperature Th and the heater power Ph in the case where the print job is executed while the standard mode continues. In addition, also in FIGS. 9A and 9B, similarly as in FIGS. 7A, 7B, 8A, and 8B, the starting point to, the job reception time point ti, and the heater stop period tx are shown.

FIGS. 9A, and 9B show the case where the standard mode is continued also after the starting point t0 in a situation where the time from the starting point t0 to the job reception time point t1 is relatively short. In the status of control of the energization state as shown in FIGS. 8A and 8B, the image forming apparatus 10 shifts to the status of control as shown in FIGS. 9A and 9B due to satisfaction of the extension condition.

In the status of control as shown in FIGS. 9A and 9B, the delay time td is short, and thus a decrease in efficiency of processing of the job is prevented. In addition, in the example of FIGS. 9A and 9B, the difference in power consumption of the heater 610 is small as compared to the example of FIGS. 8A and 8B, and, in some cases, the power consumption of the heater 610 can be lower than in the example of FIGS. 8A and 8B.

As described above, if the image forming apparatus 10 is adopted, control of shift to the power saving mode can be prevented from causing deterioration of the efficiency of processing of the job and of the power saving effect.

In the electrophotographic type image forming apparatus 10, the heater 610 has high power consumption and is a component that greatly affects the delay time td. Thus, if the difference between the standard mode and the power saving mode is the difference between a state where an amount of power to be supplied to the heater 610 is controlled and a state where power supply to the heater 610 is stopped, more significant effects on the efficiency of processing of the job and power saving by the extension of the set waiting time tks are obtained.

In the present embodiment, the extension condition includes occurrence, with the predetermined frequency, of a situation where the short-term return condition is satisfied and reception of the jobs corresponding to users the number of which is equal to or greater than the predetermined number. In this case, as described above, a situation where reception of the job occurs frequently at timing when the short-term return condition is satisfied can be predicted early.

In the example shown in FIG. 4, a cancellation condition for returning the temporarily extended set waiting time tks to the original value is that the short-term return condition becomes unsatisfied at the time of state return (S110, S114). However, the cancellation condition may be another condition.

For example, as the cancellation condition, a condition that a situation where the short-term return condition is not satisfied occurs with a predetermined frequency at the time of state return may be used. In addition, the cancellation condition may be a condition that the duration of the power saving mode at the time of state return is equal to or longer than a preset cancellation time. In this case, the cancellation time is a time longer than the upper limit time of the short-term return condition.

Second Embodiment

Next, an image forming apparatus according to a second embodiment will be described with reference to flowcharts shown in FIGS. 5 and 6. The image forming apparatus according to the second embodiment has the same configuration as the image forming apparatus 10 shown in FIGS. 1 to 4.

Figure 5:
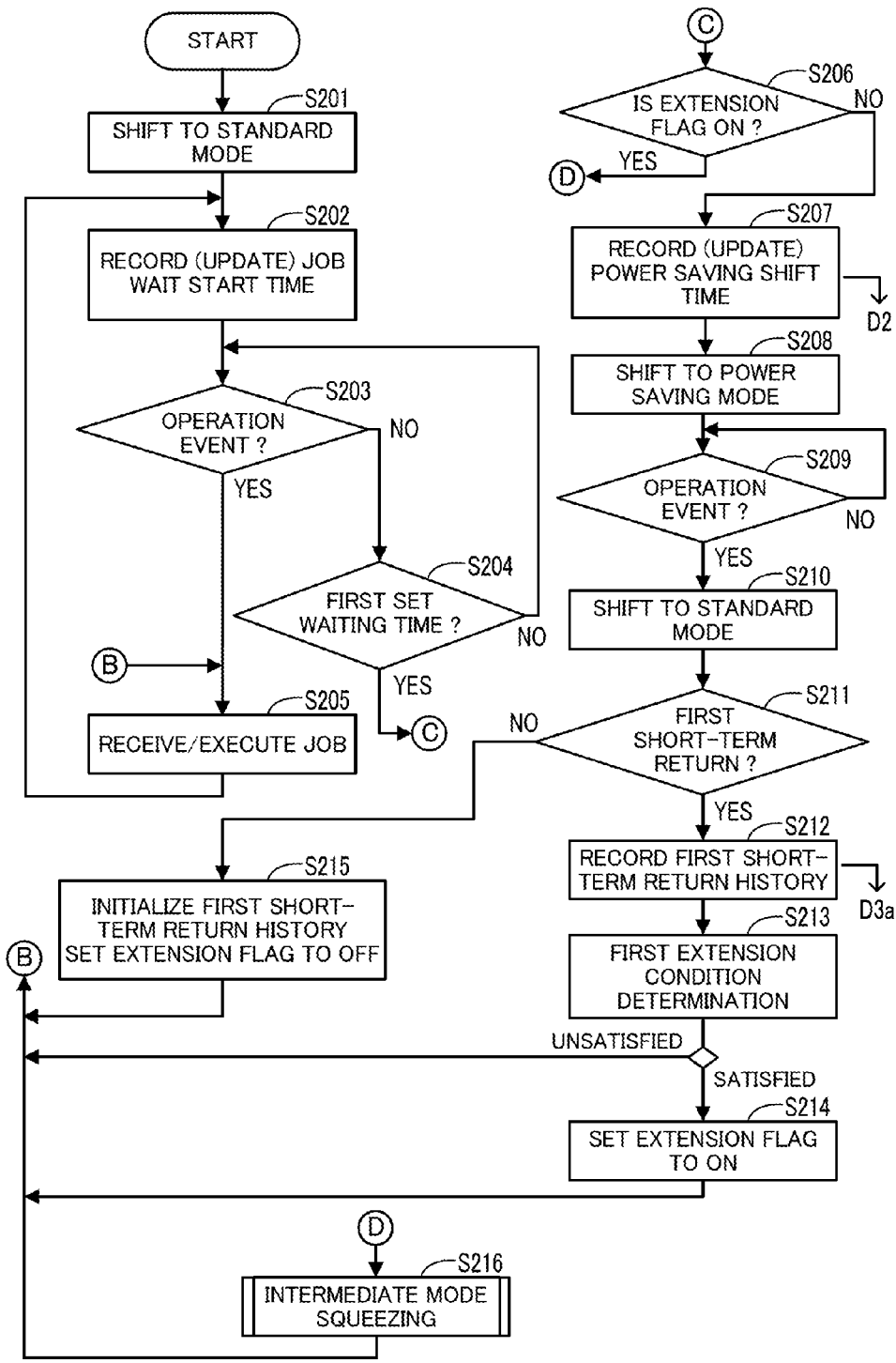
FIG. 5 is a flowchart showing an example of a procedure of energization control performed by an image forming apparatus according to a second embodiment.
Figure 6:
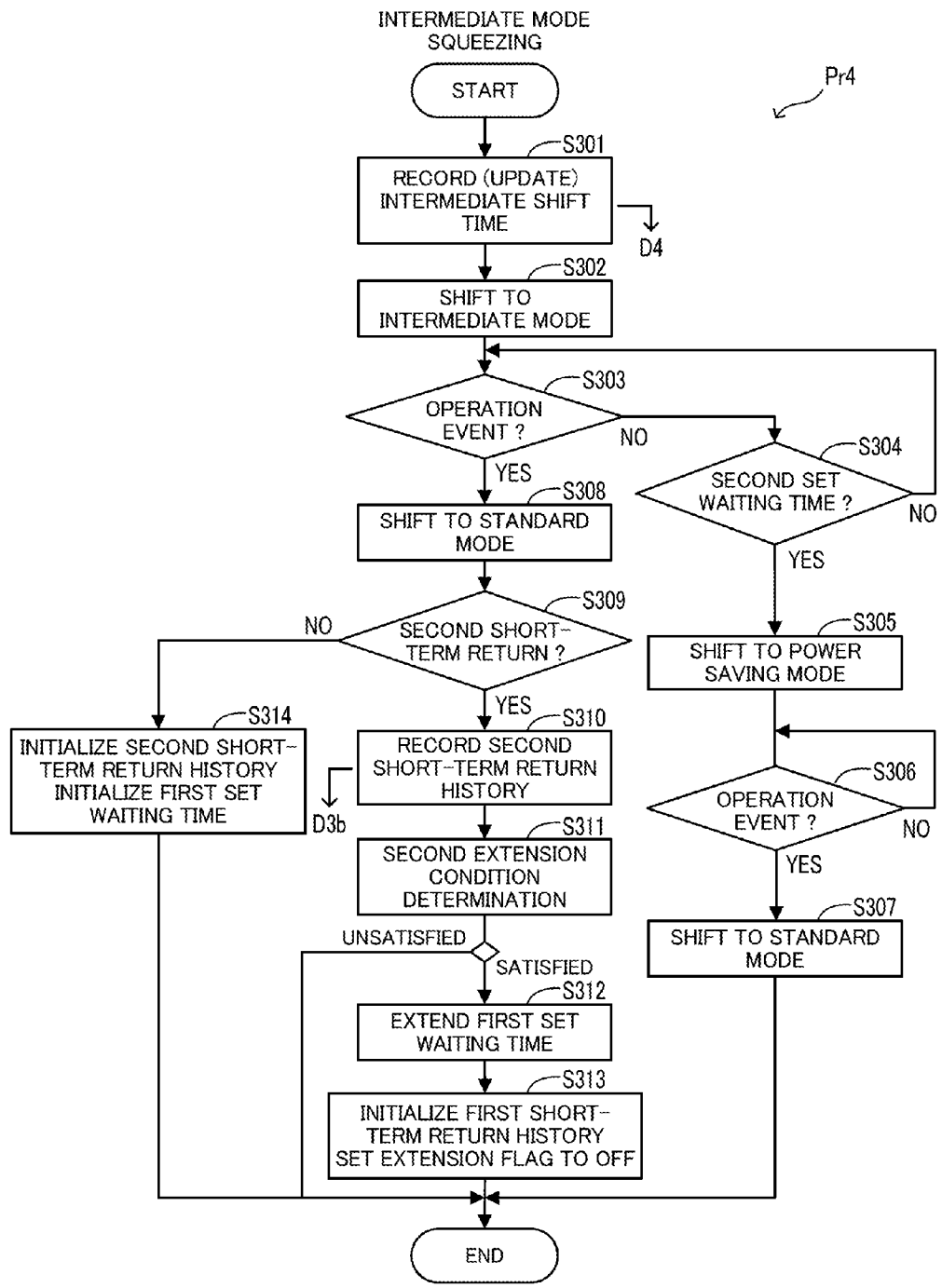
FIG. 6 is a flowchart showing an example of a procedure of an intermediate mode squeezing process performed by the image forming apparatus according to the second embodiment.

FIGS. 5 and 6 show an example of a procedure of the above-described energization control and an intermediate mode squeezing process performed by the main control portion 81 of the image forming apparatus according to the second embodiment. In the following description, S201, S202, . . . , S301, S302, . . . represent identification characters for respective steps executed by the main control portion 81.

When, for example, the main control portion 81 activates due to start of energization or a predetermined start operation is performed on the operation display portion 80 after the start of energization, the main control portion 81 starts the energization control shown in FIG. 5.

In the second embodiment, the energization control by the main control portion 81 is performed by the MPU 811 executing the power saving control program Pr1, the return control program Pr2, the power saving shift time extension program Pr3, and an intermediate mode squeezing program Pr4.

<Steps S201 to S205>

In the energization control, first, the main control portion 81 of the second embodiment performs processes in steps S201 to S205. The processes in steps S201 to S205 are the same as those in steps S101 to S105 in FIG. 4.

However, in the second embodiment, a first set waiting time tks1 and a second set waiting time tks2 are set as a monitoring time in the event wait state. The set waiting time tks in the first embodiment corresponds to the first set waiting time tks1 in the second embodiment.

<Step S206>

If the operation event has not occurred and the elapsed time from the job wait start time D1 reaches the first set waiting time tks1 in the event wait state, the main control portion 81 determines whether an extension flag which is set to ON or OFF according to a situation is ON. The initial value of the extension flag is OFF.

The extension flag is a flag for selecting whether to perform a later-described intermediate mode squeezing process, when the duration of the event wait state reaches the first set waiting time tks1. A process of changing the extension flag to ON will be described later. The main control portion 81 selects a next process in accordance with the content of the extension flag.

<Steps S207 to S213>

While the extension flag is OFF, if the operation event has not occurred and the elapsed time from the job wait start time D1 reaches the first set waiting time tks1, the main control portion 81 performs processes in steps S207 to S213. The processes in steps S207 to S213 are the same as those in steps S106 to S112 in FIG. 4.

However, in the second embodiment, each of the short-term return condition, the short-term return history information D3, and the extension condition in the first embodiment is divided into two parts. In the second embodiment, a first short-term return condition, first short-term return history information D3a, and a first extension condition correspond to the short-term return condition, the short-term return history information D3, and the extension condition, respectively, in the first embodiment.

In the second embodiment, a second short-term return condition, second short-term return history information D3b, and a second extension condition are additionally set. They will be described later.

<Step S214>

If the first extension condition is satisfied in step S213, the main control portion 81 sets the extension flag to ON. Thereafter, the main control portion 81 repeats the process from step S205.

<Step S215>

If the first short-term return condition is not satisfied in the determination in step S211, the main control portion 81 initializes the first short-term return history information D3a and sets the extension flag to OFF. Accordingly, if the extension flag has been set to ON in the past, the extension flag is returned to OFF which is the initial value. In addition, if the extension flag has remained as OFF, this state is maintained. Thereafter, the main control portion 81 repeats the process from step S205. A process of extending the first set waiting time tks1 will be described later.

<Step S216>

If a determination result that the extension flag is ON is obtained in step S206, the main control portion 81 performs the intermediate mode squeezing process.

The intermediate mode squeezing process is a process of changing the time until shift to the power saving mode to a longer time by shifting the state of the image forming apparatus 10 to an intermediate mode before shift to the power saving mode if the extension condition is satisfied in step S213.

The intermediate mode is an energization state where power consumption is higher than in the power saving mode and lower than in the standard mode. More specifically, the intermediate mode is a state where feedback control of the temperature of the heater 610 is performed under a situation where the target fixing temperature is set at a third target fixing temperature Ts3 which is lower than that in the standard mode. The third target fixing temperature Ts3 is, for example, a temperature lower than the first target fixing temperature Ts1 or the second target fixing temperature Ts2 by about 50° C. to 100° C.

Therefore, the delay time td in returning from the intermediate mode to the standard mode is shorter than the delay time td in returning from the power saving mode to the standard mode.

The intermediate mode squeezing process is performed when the operation event has not occurred and the duration of the event wait state reaches the first set waiting time tks1 (YES in S204).

The processes in steps S201 to S208 are performed by the MPU 811 executing the power saving control program Pr1. The processes in steps S209 and S210 are performed by the MPU 811 executing the return control program Pr2.

The processes in steps S211 to S215 and step S216 are performed by the MPU 811 executing the power saving shift time extension program Pr3.

Intermediate Mode Squeezing Process

Next, a specific example of the intermediate mode squeezing process performed in step S216 will be described with reference to FIG. 6. Processes in steps S301 to S313 are performed by the MPU 811 executing the intermediate mode squeezing program Pr4 which is a part of the power saving shift time extension program Pr3.

<Step S301>
In the intermediate mode squeezing process, first, the main control portion 81 records the time at this time point as an intermediate shift time D4 in the storage portion 812. If the intermediate shift time D4 has been already recorded, the intermediate shift time D4 is updated. The time is counted by the time counting portion 86.

<Step S302>
Furthermore, the main control portion 81 shifts the state of the self-apparatus from the standard mode to the intermediate mode. Accordingly, the fixation control portion 831 sets the target fixing temperature at the third target fixing temperature Ts3 which is lower than that in the standard mode. Thus, a state where an amount of power supplied to the heater 610 is lower than that in the standard mode is obtained.

<Step S303>
In the intermediate mode, the main control portion 81 monitors occurrence of the operation event.

<Step S304>
If occurrence of the operation event is not detected in step S303, the main control portion 81 determines whether an elapsed time from the intermediate shift time D4, that is, the duration of the intermediate mode, has reached the preset second set waiting time tks2.

If the elapsed time from the intermediate shift time D4 has not reached the second set waiting time tks2, the main control portion 81 repeats the process from step S303.

<Step S305>
On the other hand, if the operation event has not occurred and the elapsed time from the intermediate shift time D4 reaches the second set waiting time tks2, the main control portion 81 shifts the state of the apparatus from the intermediate mode to the power saving mode. Accordingly, power supply to the heater 610 stops.

<Step S306>
In the power saving mode, the main control portion 81 monitors occurrence of the operation event.

<Step S307>
If the operation event occurs in the intermediate mode, the main control portion 81 shifts the state of the self-apparatus from the power saving mode to the standard mode. Accordingly, the state of the self-apparatus shifts to the first standard mode.

If the operation event that has occurred is the activation operation on the operation display portion 80, the fixation control portion 831 sets the target fixing temperature at the second target fixing temperature Ts2 in accordance with control of shift to the standard mode by the main control portion 81. Accordingly, the state of the self-apparatus shifts to the second standard mode. Thereafter, the intermediate mode squeezing process ends, and the process from step S205 is repeated.

<Step S308>
On the other hand, if the operation event occurs in the intermediate mode before the elapsed time from the intermediate shift time D4 reaches the second set waiting time tks2, the main control portion 81 shifts the state of the apparatus from the intermediate mode to the standard mode.

If the operation event is reception of the print job, the fixation control portion 831 sets the target fixing temperature at the first target fixing temperature Ts1. In the other cases, the fixation control portion 831 sets the target fixing temperature at the second target fixing temperature Ts2.

<Steps S309 to S311>
Furthermore, in steps S309 to S311, the main control portion 81 performs the same processes as those in steps S110 to S112. The processes in steps S309 to S311 are a process of determining, regarding timing of returning from the intermediate mode to the standard mode, whether the second short-term return condition and the second extension condition are satisfied. The processes in steps S110 to S112 are a process of determining, regarding timing of returning from the power saving mode to the standard mode, whether the short-term return condition and the extension condition are satisfied.

In step S310, similarly as in step S111, the main control portion 81 records, in the storage portion 812, the second short-term return history information D3b including the number of times of condition satisfaction D31 and the number of users D32 regarding return from the intermediate mode.

<Step S312>
If the second extension condition is satisfied, the main control portion 81 changes the first set waiting time tks1 from the initial value to a predetermined value greater than the initial value, similarly as in step S113.

<Step S313>
Furthermore, the main control portion 81 initializes the first short-term return history information D3a and sets the extension flag to OFF. Thereafter, the intermediate mode squeezing process ends, and the process from step S205 is repeated.

<Step S314>

If the second short-term return condition is not satisfied in the determination in step S309, the main control portion 81 initializes the second short-term return history information D3b and the first set waiting time tks1. The intermediate mode squeezing process ends, and the process from step S205 is repeated.

When the MPU 811 executes the intermediate mode squeezing program Pr4, if the first extension condition is satisfied, the main control portion 81 changes the power saving shift set time to a longer time by shifting the state of the self-apparatus to the intermediate mode in accordance with the duration of the event wait state before shift to the power saving mode. The main control portion 81 at this time is an example of an intermediate mode squeezing portion.

Also in the second embodiment described above, the main control portion 81 predicts whether a use status where reception of the new job occurs frequently in a relatively short time from shift to the power saving mode, will occur (S211 to S213).

In the second embodiment, under the situation where the extension flag is OFF, the first set waiting time tks1 corresponds to the power saving shift set time by which timing of shifting to the power saving mode in accordance with the duration of the event wait state is determined.

In the second embodiment, under the situation where the extension flag is ON, a time obtained by adding the second set waiting time tks2 representing maximum duration of the intermediate mode to the initial value of the first set waiting time tks1 corresponds to the power saving shift set time. The extension flag is set to ON when the first extension condition is satisfied (S214).

Also in the second embodiment, the main control portion 81 predicts whether a use status where reception of the new job occurs frequently in a relatively short time from the time of shift to the power saving mode, that is, a use status where the efficiency of processing of the job deteriorates and the power saving effect cannot be expected, will occur (S211 to S213).

If the main control portion 81 predicts that the use status will occur, the main control portion 81 changes the power saving shift set time to a longer time by shifting the state of the self-apparatus to the intermediate mode in accordance with the duration of the event wait state before shift to the power saving mode.

In other words, the main control portion 81 changes the power saving shift set time to a longer time by squeezing the intermediate mode between the standard mode and the power saving mode. Accordingly, even in the above-described use status, a possibility that the job can be received in the intermediate mode is increased before the state of the apparatus shifts to the power saving mode.

Figure 10A:
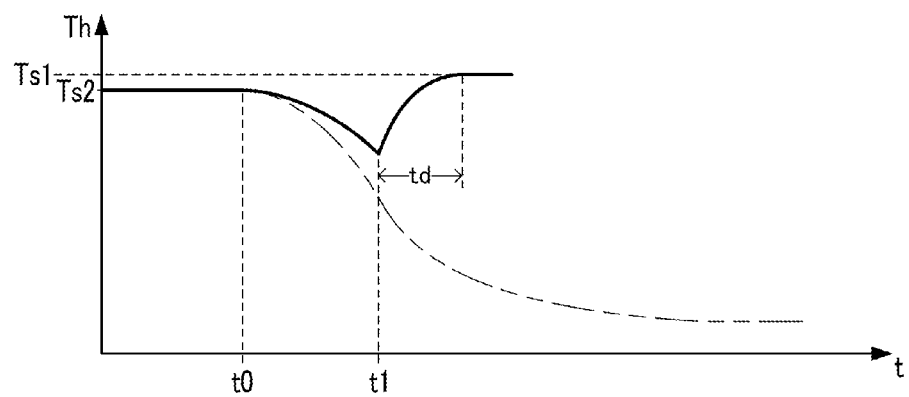
FIGS. 10A and 10B are trend graphs of a fixation detection temperature and heater power when a print job is executed after a relatively short time from shift to an intermediate mode in the image forming apparatus.
Figure 10B:
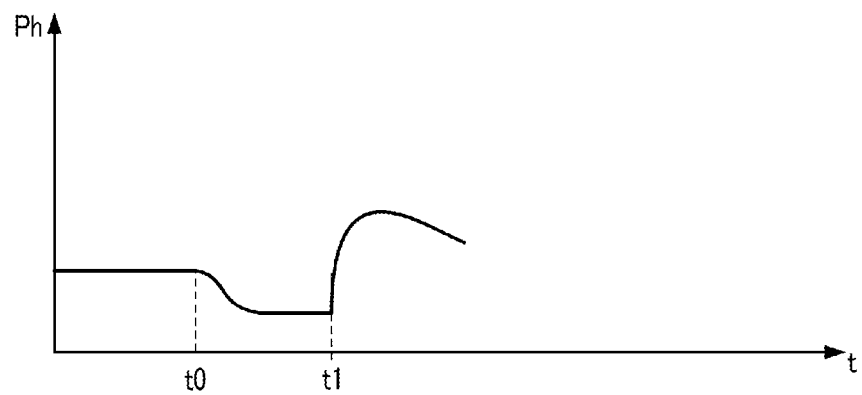

FIGS. 10A and 10B are trend graphs of the fixation detection temperature Th and the heater power Ph when the print job is executed after a relatively short time from shift to the intermediate mode.

As shown in FIGS. 10A and 10B, the delay time td in returning from the intermediate mode to the standard mode is shorter than the delay time td in returning from the power saving mode to the standard mode as shown in FIGS. 8A and 8B.

Therefore, also in the second embodiment, control of shift to the power saving mode can be prevented from causing deterioration of the efficiency of processing of the job and of the power saving effect.

In the second embodiment, if the second extension condition determined in returning from the intermediate mode to the standard mode is satisfied, the first set waiting time tks1 is changed from the initial value to a longer time (S312).

That is, in the second embodiment, if the first extension condition is satisfied, the power saving shift set time is changed to a longer time by squeezing the intermediate mode between the standard mode and the power saving mode as a first stage. In this case, the power saving effect is higher than when the standard mode is continued, and the delay time td can be shorter than in shifting to the power saving mode.

That is, in the status of control, in FIGS. 10A and 10B, of squeezing the intermediate mode, the power saving effect is higher than in the status of control, in FIGS. 9A and 9B, of continuing the standard mode. In addition, in the status of control, in FIGS. 10A and 10B, of squeezing the intermediate mode, the delay time td can be shorter than in the status of control, in FIGS. 8A and 8B, of shifting to the power saving mode, not via the intermediate mode.

If the second extension condition is satisfied under the situation where squeezing the intermediate mode is performed, the duration of the standard mode is extended by extending the first target fixing temperature Ts1 as a second stage (S312). Accordingly, the delay time td can be shorter than in the process of squeezing the intermediate mode.

Application Examples

In each embodiment described above, as a parameter for the determination as to the short-term return condition and the extension condition, another parameter which changes in accordance with the duration of the power saving mode may be adopted instead of the duration of the event wait state. Hereinafter, a value of the parameter is referred to as a target parameter value.

For example, the fixation detection temperature Th may be adopted as the target parameter value. As the duration of the power saving mode becomes longer, the fixation detection temperature Th gradually decreases from the temperature in the standard mode.

Therefore, if the fixation detection temperature Th is adopted as the target parameter value, the short-term return condition is, as a necessary condition, that the fixation detection temperature Th is not less than a preset lower limit temperature.

For example, a condition that the fixation detection temperature Th is equal to or greater than the above-described lower limit temperature may be adopted as the short-term return condition. In addition, a condition that the fixation detection temperature Th is within the range from a present upper limit temperature to the lower limit temperature may be adopted as the short-term return condition.

In the second embodiment, the processes in steps S309 to S313 may be omitted. In this case, the process of squeezing the intermediate mode between the standard mode and the power saving mode (S206, S215) is valid, but the process of extending the first set waiting time tks1 (S312) is invalidated.

In each embodiment, the MPU 811 may count the duration of the event wait state, the duration of the power saving mode, and the duration of the intermediate mode, etc.

The image forming apparatus according to the present disclosure can be configured by freely combining the embodiments and application examples described above, or modifying or partially omitting the embodiments and the application examples as appropriate, within the scope of the invention recited in each claim.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
   a power saving control portion configured to shift a state of the self-apparatus to a power saving mode where power consumption is lower than in a standard mode, if a duration of an event wait state for which occurrence of an operation event including reception of a new job regarding image formation is waited for has reached a preset power saving shift set time;
   a return control portion configured to shift the state of the self-apparatus to the standard mode if the operation event occurs in the power saving mode; and
   a power saving shift time extension portion configured to temporarily change the power saving shift set time to a longer time if a predetermined extension condition is satisfied, wherein
   the extension condition is a condition including occurrence, with a predetermined frequency, of a situation where a duration of the power saving mode at a time of state return or a target parameter value satisfies a predetermined short-term return condition,
   the time of state return is a time when the state of the self-apparatus is shifted from the power saving mode to the standard mode by the return control portion, and
   the target parameter value is a value of a parameter which changes in accordance with the duration of the power saving mode.

2. The image forming apparatus according to claim 1, further comprising:
   a heater configured to heat a developer image formed on a sheet-like image recording medium; and
   a temperature sensor configured to detect a temperature of a portion heated by the heater, wherein
   the standard mode is a state where an amount of power to be supplied to the heater is controlled through feedback control of a detected temperature of the temperature sensor, and
   the power saving mode is a state where power supply to the heater is stopped.

3. The image forming apparatus according to claim 2, wherein the target parameter value is the detected temperature of the temperature sensor.

4. The image forming apparatus according to claim 1, wherein
   the power saving shift time extension portion includes an intermediate mode squeezing portion configured to change the power saving shift set time to a longer time by shifting the state of the self-apparatus to an intermediate mode in accordance with the duration of the event wait state before shift to the power saving mode, if the extension condition is satisfied, wherein
   the intermediate mode is a state where power consumption is higher than in the power saving mode and lower than in the standard mode.

5. The image forming apparatus according to claim 1, wherein the extension condition includes: occurrence, with the predetermined frequency, of a situation where the short-term return condition is satisfied; and reception of the jobs corresponding to users the number of which is equal to or greater than a predetermined number, during the occurrence, with the predetermined frequency, of the situation where the short-term return condition is satisfied.

* * * * *